US005761339A

United States Patent [19]
Ikeshoji et al.

[11] Patent Number: 5,761,339
[45] Date of Patent: Jun. 2, 1998

[54] METHOD AND RECORDING MEDIUM FOR SEPARATING AND COMPOSING BACKGROUND AND CHARACTER IMAGE DATA

[75] Inventors: Nobuo Ikeshoji; Tatsuya Yamamoto, both of Yokohama; Toshiro Kamiuchi, Suginami-ku; Nagaharu Hamada, Hitachi; Koichi Honda, Fujisawa; Hiromi Yamakawa, Fijisawa, all of Japan

[73] Assignee: Hitachi, Ltd., Tokyo, Japan

[21] Appl. No.: 563,533

[22] Filed: Nov. 28, 1995

[51] Int. Cl.$^6$ ........................... H04N 1/409
[52] U.S. Cl. ............. 382/176; 382/263; 382/284; 385/462; 385/464
[58] Field of Search .............. 358/448, 461–464; 382/263, 264, 266, 274, 291, 292, 174, 175, 176, 284; H04N 1/403, 1/409

[56] References Cited

U.S. PATENT DOCUMENTS

| | | | |
|---|---|---|---|
| 5,267,333 | 11/1993 | Aono et al. | 358/464 |
| 5,293,430 | 3/1994 | Shiau et al. | 358/464 |
| 5,392,362 | 2/1995 | Kimura et al. | 358/464 |
| 5,497,249 | 3/1996 | Korzumi et al. | 358/464 |

*Primary Examiner*—Kim Vu
*Attorney, Agent, or Firm*—Bardehle, Pagenberg, Dost, Altenburg, Frohwitter, Geissler

[57] ABSTRACT

An image processing method for automatically executing operation steps of repairing a defect of an image of a document which is read by a scanner and changing a background image in a short time and a recording medium for storing them. An image processing method comprising:

(a) A step of separating background image data from said image data by processing by a maximum filter for comparing the brightness of each pixel constituting said image data with the brightness of peripheral pixels and replacing it with the maximum brightness; and (b) a step of separating character and figure image data by subtracting the background image data obtained by the above step in (a) from the above image data.

9 Claims, 11 Drawing Sheets

(a) HISTOGRAM (b) ACCUMULATED HISTOGRAM (a) HISTOGRAM (b) ACCUMULATED HISTOGRAM

METHOD AND RECORDING MEDIUM FOR SEPARATING AND COMPOSING BACKGROUND AND CHARACTER IMAGE DATA

BACKGROUND OF THE INVENTION

The present invention relates to an image processing method suitable for correction of an image when a natural image such as a photograph or a picture or a document of characters and/or figures drawn on a paper is read by an electronic means such as a scanner and recorded on a recording medium or displayed on a display.

An art for this kind of image processing method is disclosed in, for example. Japanese Journal of Television. Vol. 47, No. 12, pp. 1669–1672, 1993 "Presentation System Using Hi-Vision Still Image System".

In the image processing method as disclosed in the above journal, when a high definition image is corrected or a defect of a document is repaired, the repair work is executed manually using the functions provided in the image processing program and the repair work and editing work require a lot of time and labor.

SUMMARY OF THE INVENTION

The present invention is intended to solve the aforementioned problems of the prior arts and an object of the present invention is to provide an image processing method for executing operation steps of repairing a defect of a document and changing a background image in a short time and furthermore executing those operation steps automatically and a recording medium for storing them.

The image processing method of the present invention for accomplishment of the above object comprises the following steps.

(a) A step of separating background image data from said image data by processing by a maximum filter for comparing the brightness of each pixel constituting said image data with the brightness of peripheral pixels and replacing it with the maximum brightness; and (b) a step of separating character and figure image data by subtracting the background image data obtained by the above step in (a) from the above image data.

According to the present invention having the aforementioned constitution, stains and scratches existing on a document are removed from the image data of the document which is read from the scanner and the image data can be restored in the original or desired state.

DETAILED DESCRIPTION OF THE PREFERRED EMBODIMENTS

The embodiments of the image processing method of the present invention will be explained hereunder with reference to the accompanying drawings.

Each step of the image processing method explained hereunder is executed, for example, by a program stored in an image processing file on a system including a computer such as a stand-alone personal computer, work station, or image processing display device.

Figure 1:
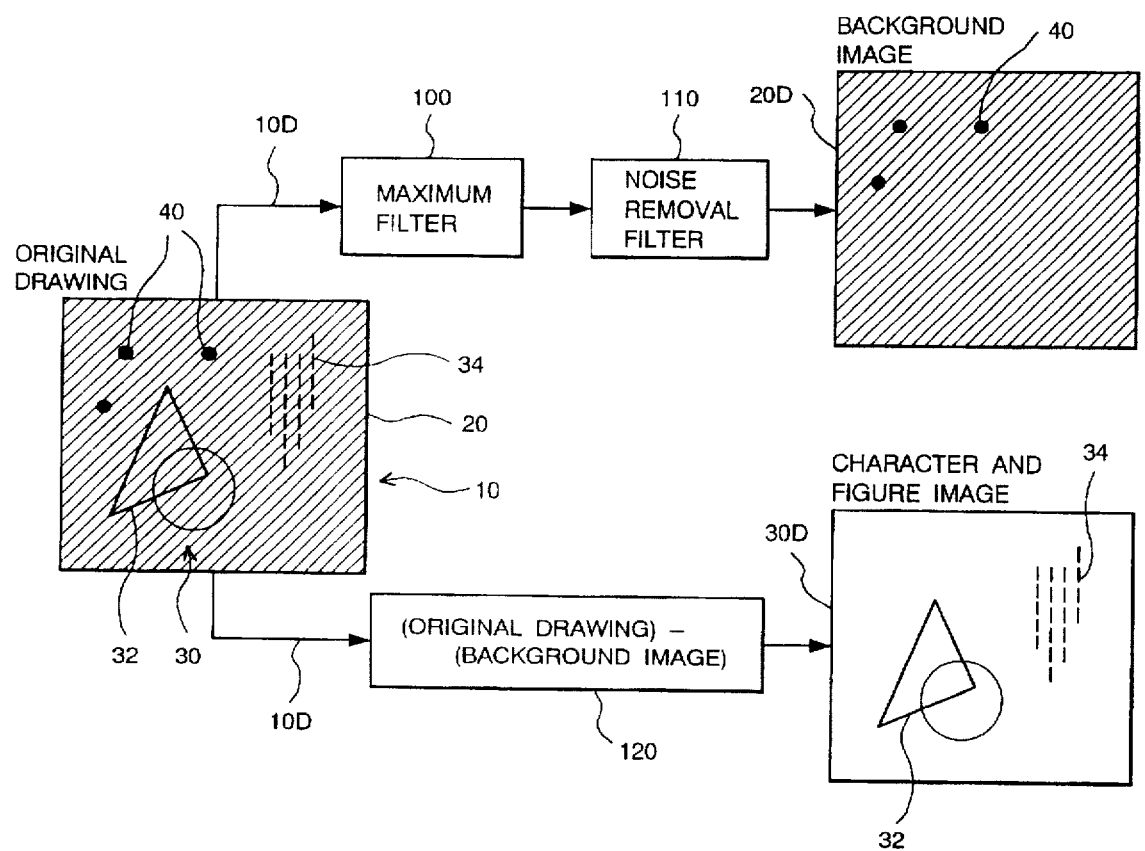
FIG. 1 shows an embodiment of the image processing method of the present invention and is an illustration showing a method for separating a character and figure image and a background image included in an original drawing.

FIG. 1 is an illustration showing a method for separating a character and figure image and a background image included in an original drawing which is a document.

In FIG. 1, an original drawing 10 comprises a character and figure image 30 in which a circle and triangle shown by FIG. 32 or optional characters shown by Character 34 are drawn on a background image 20 of a paper or campus. There exist spots of stains 40 on the background image 20 of the original drawing 10.

Firstly, the original drawing 10 is read by a scanner (not shown in the drawing) attached to an image processor which is not shown in the drawing so as to create image data 10D or the image data 10D which is stored in the image file beforehand is read from the image processor and then the process for passing the image data 10D through the maximum filter 100 is executed.

The maximum filter 100 has a function for comparing the brightness of optional pixel data constituting the image data 10D and the brightness of peripheral pixel data other than the optional pixel data and replacing the brightness of the optional image data with the maximum brightness.

Namely, the brightness of pixels of the line portion of FIG. 32 on the character and figure image 30 is lower (darker) than the brightness of pixels of the peripheral background portion. When the brightness of pixels with a lower brightness is replaced with the maximum brightness of peripheral pixels, the brightness of pixels of the line portion becomes equal to the peripheral brightness and the lines are eliminated. Therefore, Character 34 and FIG. 32 comprising lines are eliminated.

This maximum filter 100 can adjust the radius to be applied, so that by adjusting the radius, stains 40 comprising more pixels than the pixels of the lines can be included in the background image without being eliminated.

Next, the image data 10D processed by the maximum filter 100 is processed by a noise removal filter 110. This noise removal filter 110 has a function for calculating the average of weighing loads of the brightness of an optional pixel and the brightness of a plurality of pixels around it and replacing it with the brightness of the optional pixel. Therefore, the image data 10D passing through the noise removal filter 110 is put into an ambiguous state as a whole and by this process, background image data 20D including the spots of stains 40 is obtained.

Furthermore, when a process of subtracting the background image data 20D from the image data 10D by a subtraction process 120 is executed, character and figure image data 30D is obtained.

These background image data 20D and the character and figure image data 30D are stored in the image file by the image processor.

The aforementioned processing method shown in FIG. 1 is a processing method suited to a case that comparatively more stains are adhered to an original drawing and by executing the maximum filter process, noise removal filter process, and subtraction process, stains adhered to an original drawing can be removed efficiently.

Furthermore, by automatically executing each of those processes, a series of steps can be processed in a shorter time.

Figure 2:
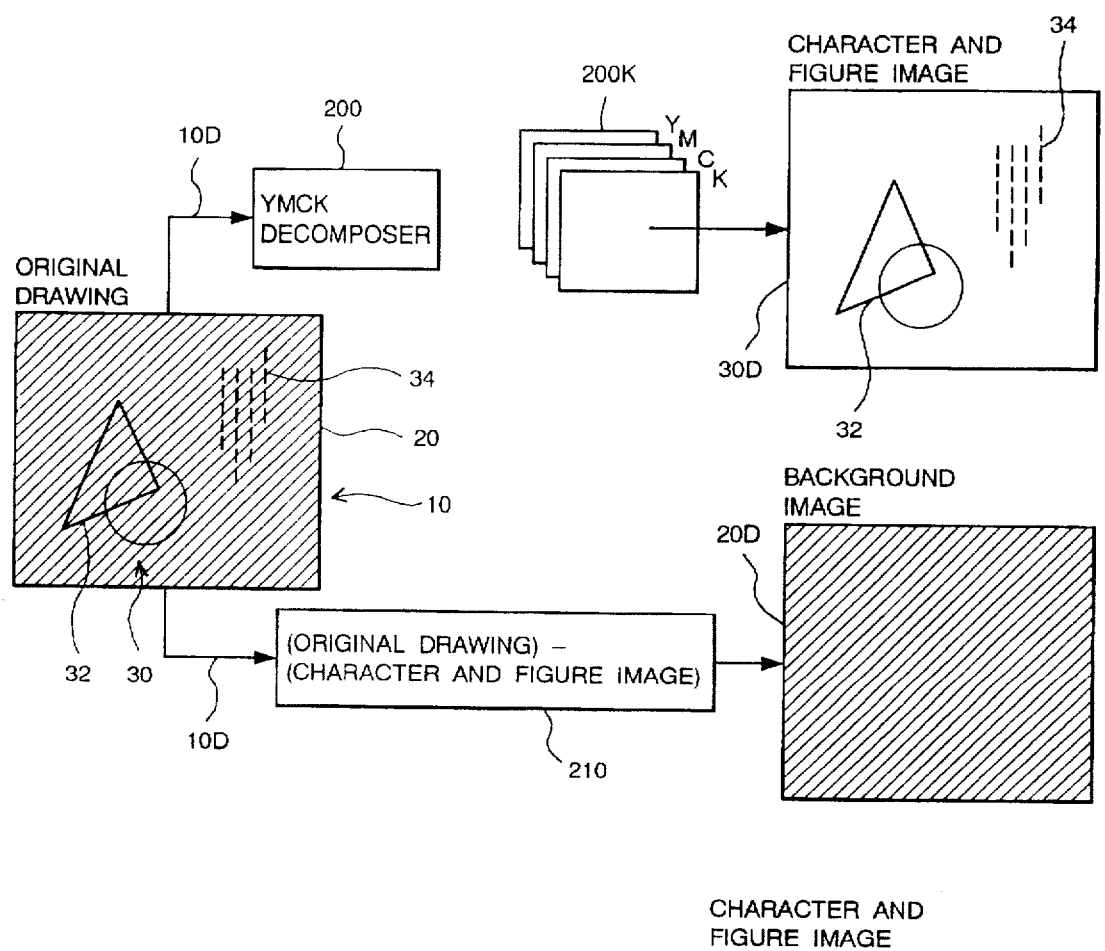
FIG. 2 is an illustration showing a method for separating the character and figure image and the background image when the character and figure image shown in FIG. 1 is drawn in a specific color.

FIG. 2 is an illustration for separating an original drawing into a background image and a character and figure image in consideration that characters and figures are often expressed in black on a background drawing such as a paper. The original drawing 10 is expressed by the background image 20 and the character and figure image 30 as in FIG. 1.

In this embodiment, the image data 10D reading the original drawing 10 or the image 10D which is read from an image file stored beforehand is sent to a YMCK decomposer 200 so as to be decomposed to four colors of yellow (Y), magenta (M), cyan (C), and black (K).

When black image data 200K among them is extracted, character and figure image data 30D comprising only black portions is obtained. In this case, the black image data 200K is extracted. However, needless to say, it is possible to extract image data other than black.

Next, the image data 10D is sent to a subtraction processor 210 and a process of subtracting the character and figure image data 30D from the image data 10D is executed. By this process, the background image data 20D can be obtained. These character and figure image data 30D and background image data 20D are stored in the image file.

The aforementioned processing method shown in FIG. 2 is a processing method suited to a case that an original drawing is separated to a background drawing and a character and figure drawing when characters and figures are expressed in black on a background drawing such as a paper and by executing the YMCK decomposition process and the subtraction process, the original drawing can be separated to the background drawing and the character and figure drawing efficiently.

Furthermore, by automatically executing each of those processes, a series of steps can be processed in a shorter time.

Figure 3:
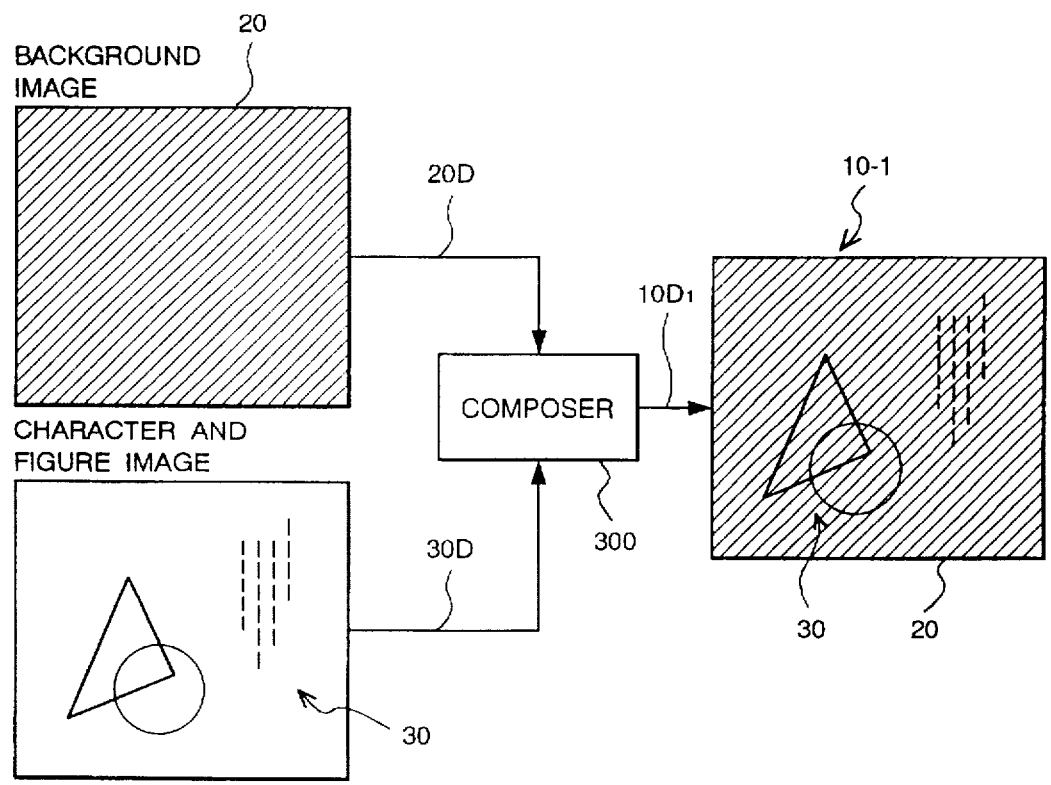
FIG. 3 is an illustration showing an embodiment for combining the background image data and the character and figure image data which are separated from each other in the embodiment shown in FIGS. 1 or 2 so as to restore the original drawing.

FIG. 3 is an illustration for the process of restoring the original drawing by composing the separated background image data and character and figure image data which are shown in FIGS. 1 and 2.

The background image data 20D of the background image 20 and the character and figure image data 30D of the original drawing which is read from the image file obtained by the process shown in FIG. 2 are sent to a composer 300. The composer 300 adds the background image data 20D and the character and figure image data 30D and outputs and stores image data 10D1 in the image file.

On a display image 10-1 which is obtained by displaying the image data 10D1 on an image display device (not shown in the drawing), a character and figure image is composed and displayed on a background image on which stains are removed and the initial state of the original drawing when it is produced is restored. According to the embodiment shown in FIG. 3, minute shades of the background image are also removed, so that a flat image as a whole is obtained.

Figure 4:
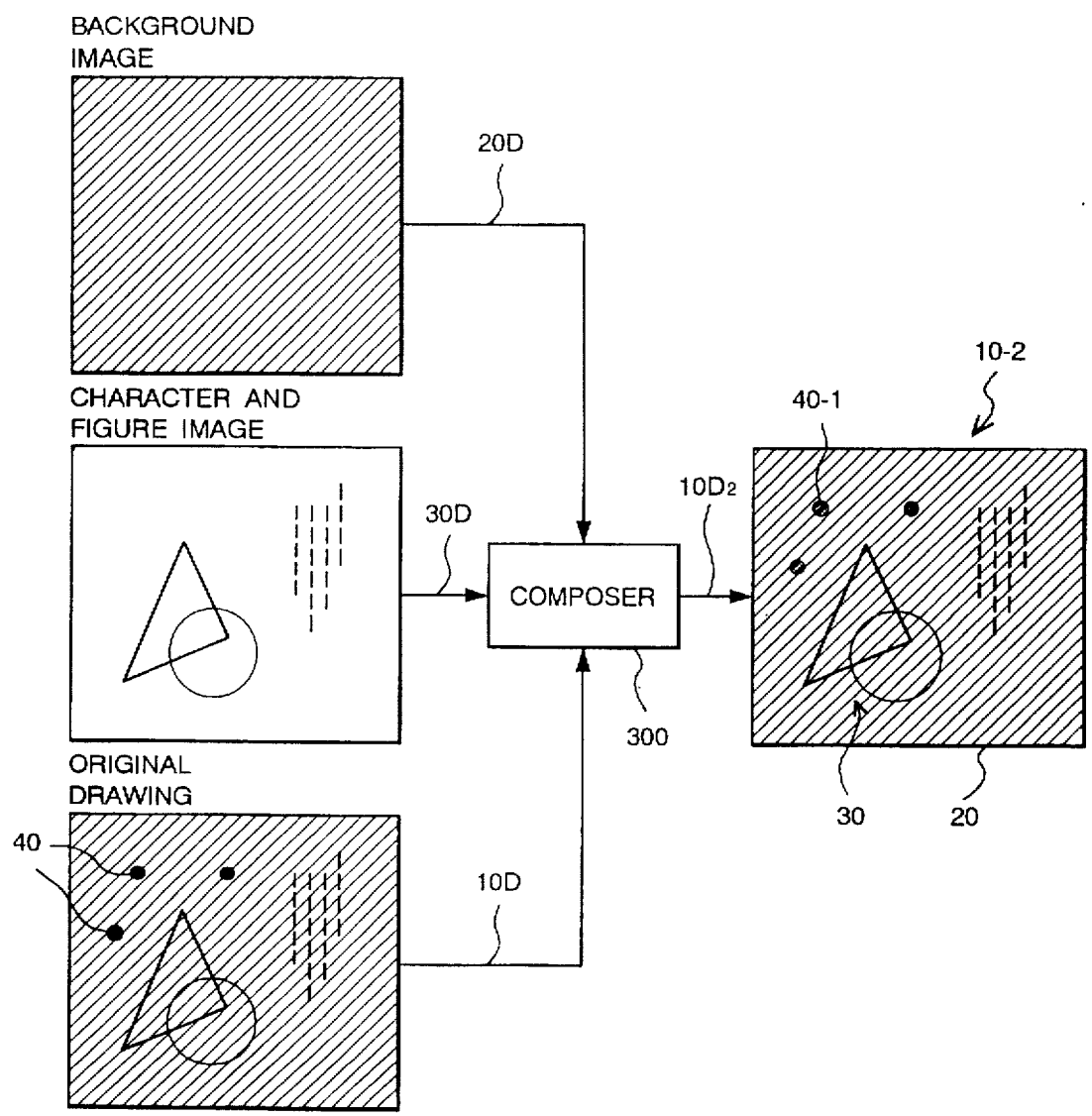
FIG. 4 is an illustration showing an embodiment of a method for adding and processing the image data of the original drawing to the image obtained in the embodiment shown in FIG. 3.

In FIG. 4 shown next, a processing method in which the image data of the original drawing is added to the embodiment shown in FIG. 3 will be explained.

The background image data 20D, the character and figure image data 30D, and the image data 10D of the original drawing which are stored in the image file are sent to the composer 300. The composer 300 adds these input data and stores image data 10D2 in the image file. In this case, when the addition rate, that is, the extent of addition of the image data 10D including the spots of stains 40, the background image data 20D, and the character and figure image data 30D is designated as a parameter to the composer 300, for example, as a weighing average of each image data, the output of the image data 10D2 can be changed. In FIG. 4, a parameter for lowering the extent of the spots of stains 40 is designated.

In a display image 10-2 which is obtained by displaying the image data 10D2 on a display device (not shown in the drawing), the spots of stains 40 existing on the image data 10D are displayed as stains 40-1 which are thinned more. Even in the background image 20 of the other portion, the characteristic of the original drawing is displayed on a lower level.

Therefore, compared with the embodiment shown in FIG. 3, a display image in which the whole outward appearance is improved though the image of the original drawing remains can be obtained.

Figure 5:
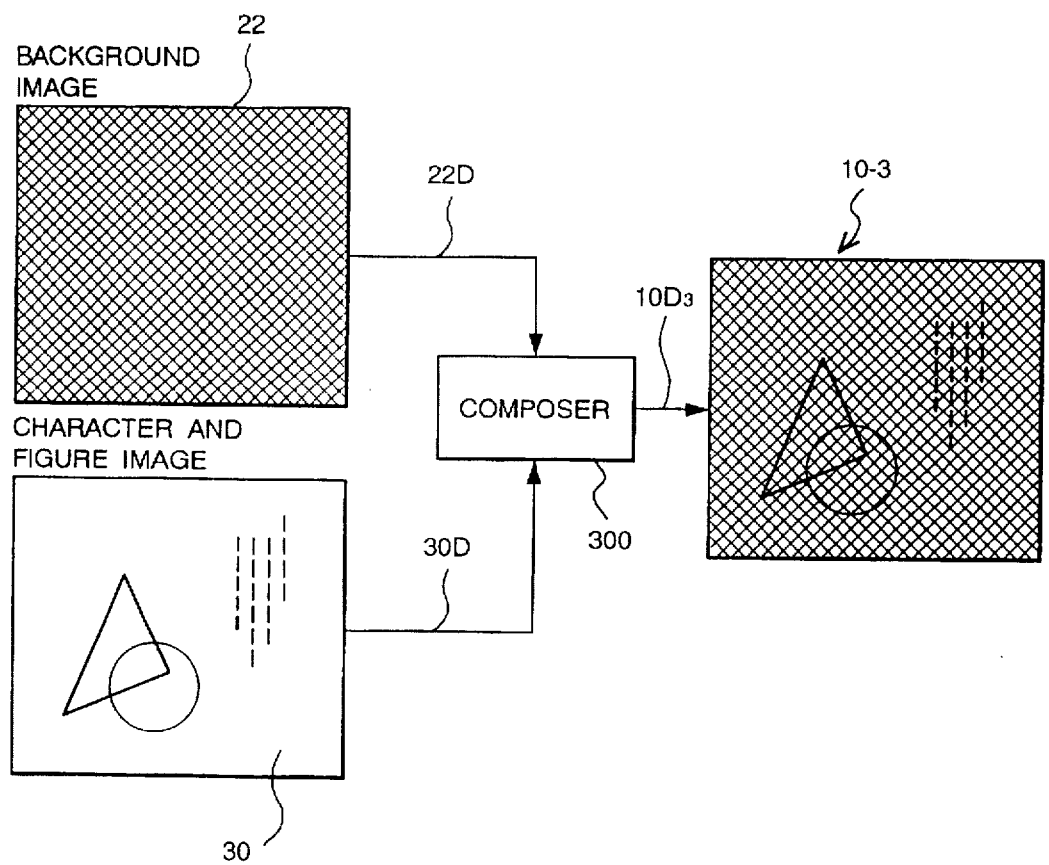
FIG. 5 is an illustration showing another embodiment of the image processing method of the present invention.

FIG. 5 shows still another embodiment of the present invention.

According to this embodiment, image data 22D of another background image 22 which is different from the background image 20 of the original drawing and the character and figure image data 30D of the character and figure image 30 comprising characters and figures are read from the image file. For example, assuming that the background image 20 of the original drawing 10 is a paper, the background image 22 is a wooden plate or a stone wall.

The image data 22D and the character and figure image data 30D are inputted to the composer 300 and display image data 10D3 is stored in the image file.

By this process, when optional background image data is added to optional character and figure image data, desired image data can be obtained easily.

When the composition process shown in FIGS. 3, 4, and 5 is combined with the separation process shown in FIGS. 1 and 2, a series of processes can be executed and efficient operation steps can be realized.

Needless to say, the image file for storing each image data is set in the image display device and image data read from the image file can be composed by the composer in the image display device.

Furthermore, by automatically executing each of those processes, a series of steps can be processed in a shorter time.

Next, when a stained portion 50 is adhered to the background image 20 of the original drawing 10 comprising a paper, a process of eliminating the stained portion 50 or making the stain inconspicuous will be explained by referring to FIG. 6.

Figure 9:
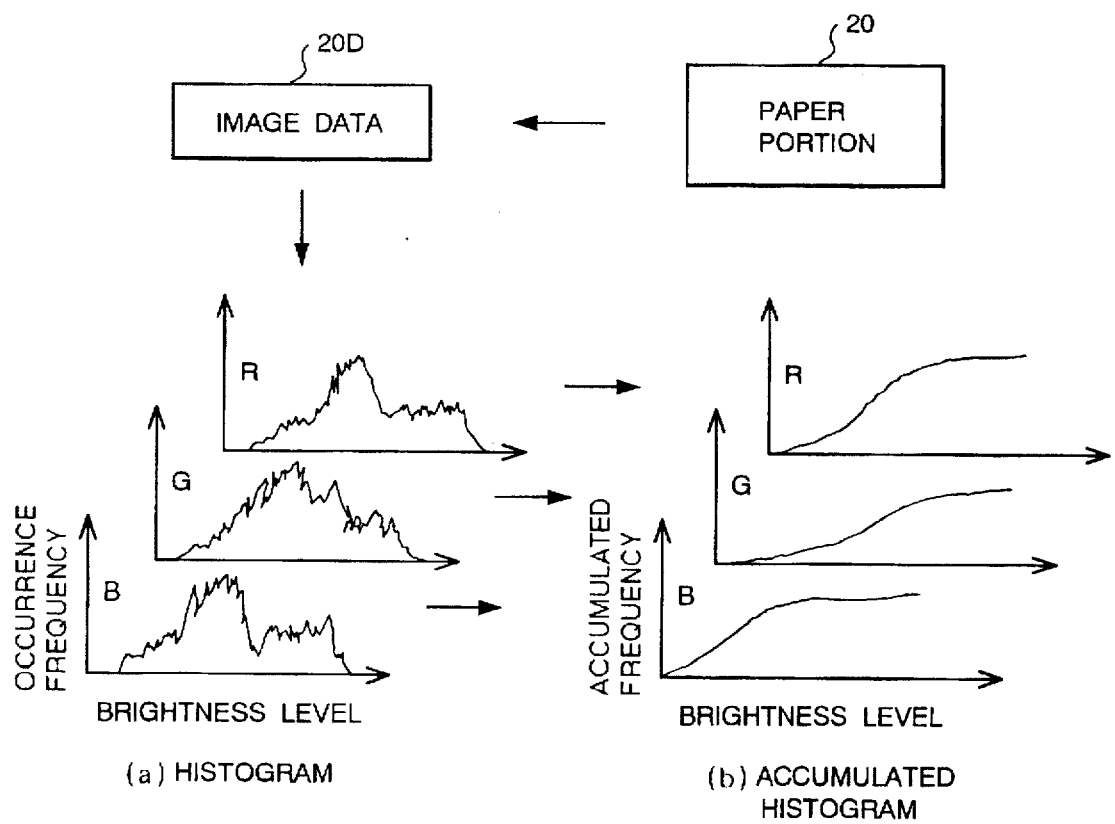
FIGS. 9, 10, 11, 12, 13, and 14 are illustrations showing a method for preparing the histograms used in the embodiments explained in FIGS. 6 to 8.

Firstly, before starting the process, a paper portion 20 is read by the scanner as shown in FIG. 9 and image data 20D of the paper portion 20 is created or image data 20D stored beforehand is read from the image file. Next, this image data 20D is separated to signals of three primary colors R, G, and B. The horizontal axis is represented by brightness level of an image and the vertical axis is represented by occurrence frequency and a histogram is created for each of R, G, and B.

By integrating the occurrence frequency of each histogram, three kinds of accumulated histograms of R, G, and B when the horizontal axis is represented by brightness level and the vertical axis is represented by accumulated frequency are obtained.

Figure 10:
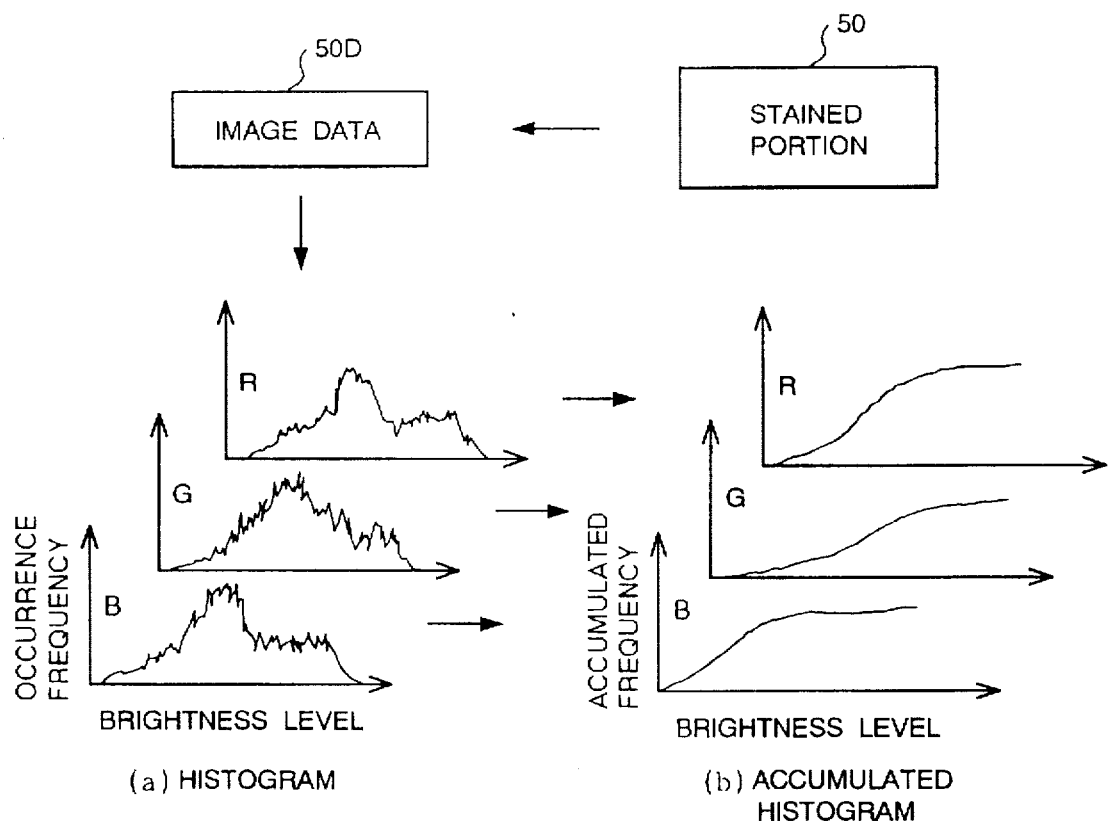

On the other hand, as shown in FIG. 10, by processing the stained portion 50 in the same way, three kinds of histograms of R, G, and B are obtained.

Next, using the six kinds of accumulated histograms of the paper portion and the stained portion, histogram matching filters for correcting the image data of the stained portion on the basis of the image data of the paper portion are created.

For simplicity of explanation, a case that only a signal of R among the three primary colors is processed will be explained hereunder. However, needless to say, signals of G and B among the three primary colors are also processed in the same way.

The basic method of the process is that by executing a process of bringing the curve of the accumulated histogram of R of the image data of the paper portion close to the curve of the accumulated histogram of R of the image data of the stained portion, the color tone of the stained portion starting from the color tune of the paper portion is reproduced to the color tune of the paper portion using the output of R based on a curve obtained during the process (actually, G and B are processed at the same time).

Figure 11:
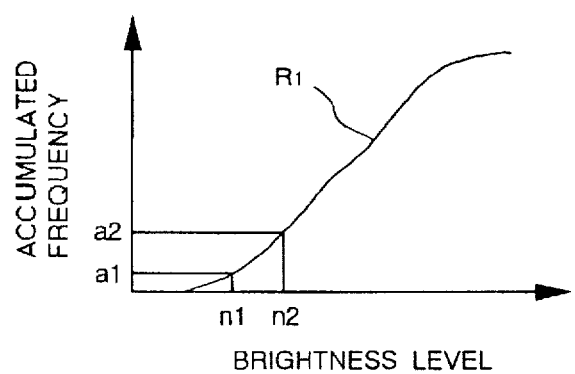
Figure 12:
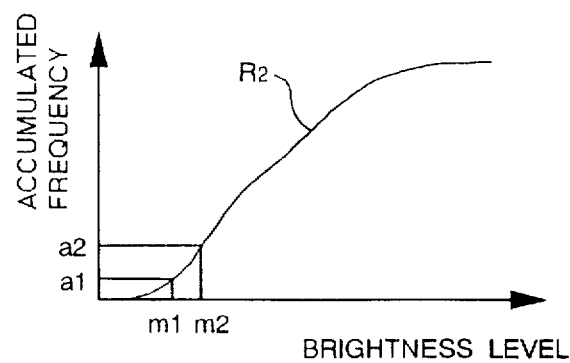

FIG. 11 shows a curve R1 of the accumulated histogram of R of the paper portion and FIG. 12 shows a curve R2 of the accumulated histogram of R of the stained portion.

Firstly, the brightness levels n1, n2, . . . corresponding to the accumulated frequencies a1, a2, . . . of the curve R1 and the brightness levels m1, m2, . . . corresponding to the accumulated frequencies a1, a2, . . . of the curve R2 are obtained.

Figure 13:
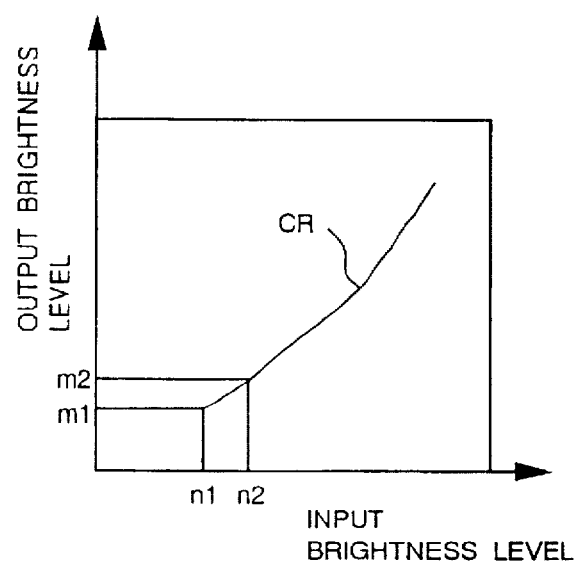
Figure 14:
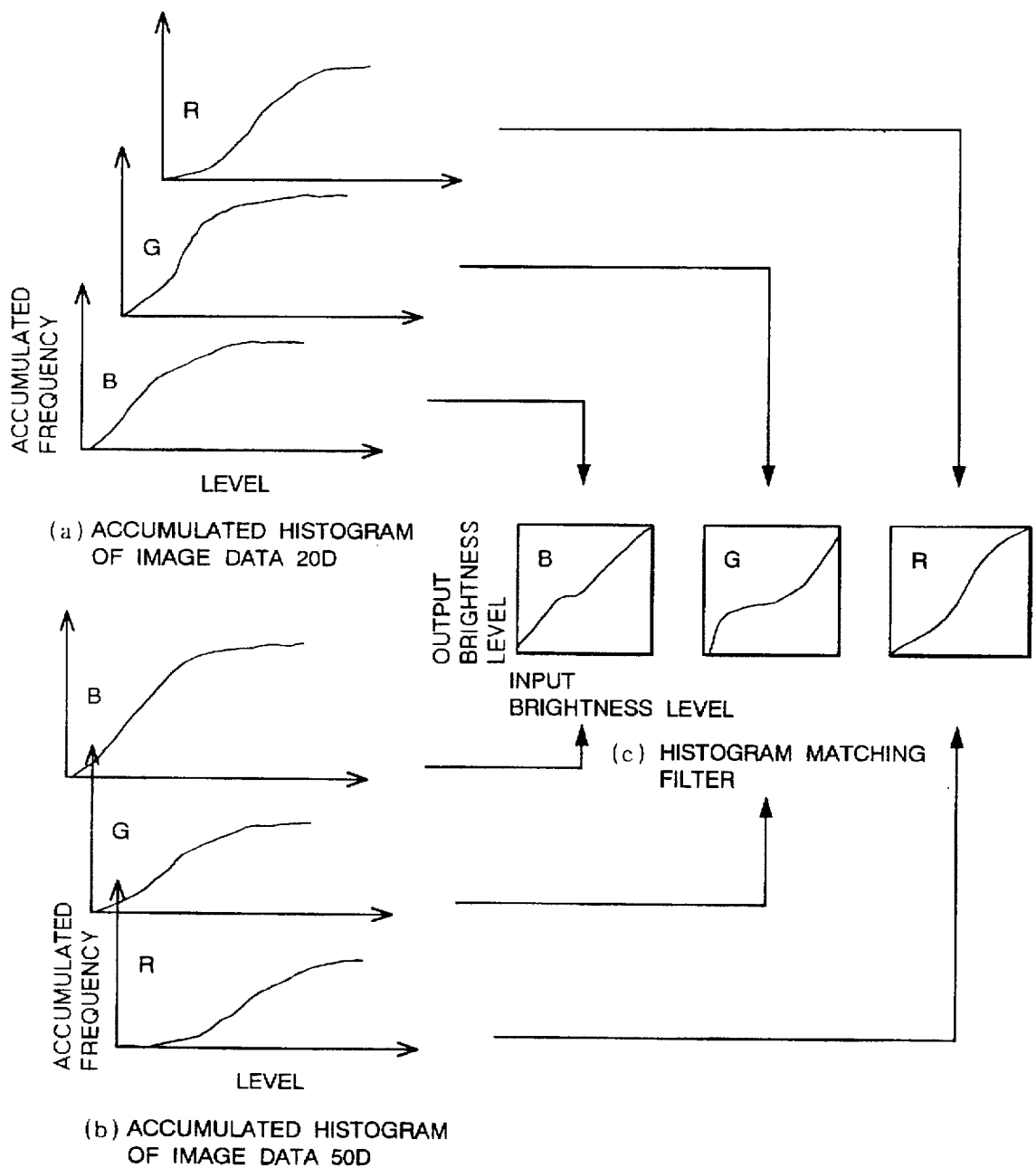

Next, as shown in FIG. 13, the brightness levels n1, n2, . . . are plotted on the horizontal axis and the brightness levels m1, m2, . . . are plotted on the vertical axis so as to obtain a curve CR. FIG. 13 shows a filter for the image data of R. A method for creating a conversion table for the image data of R has been described above. By this method, as shown in FIG. 14, three kinds of histogram matching filters of R, G, and B are created. Histogram matching filters man be read from the image file stored beforehand.

By using the histogram matching filters, the first image data can be brought close to second image data 50D or by creating a filter for inputting m1, m2, . . . and outputting n1, n2, . . . , the second image data 50D can be brought close to the first image data 20D.

By passing through a histogram matching filter 400 created by the above process, the image data 50D of the stained portion 50 can be approximated to the image data 20D of the paper portion.

Figure 7:
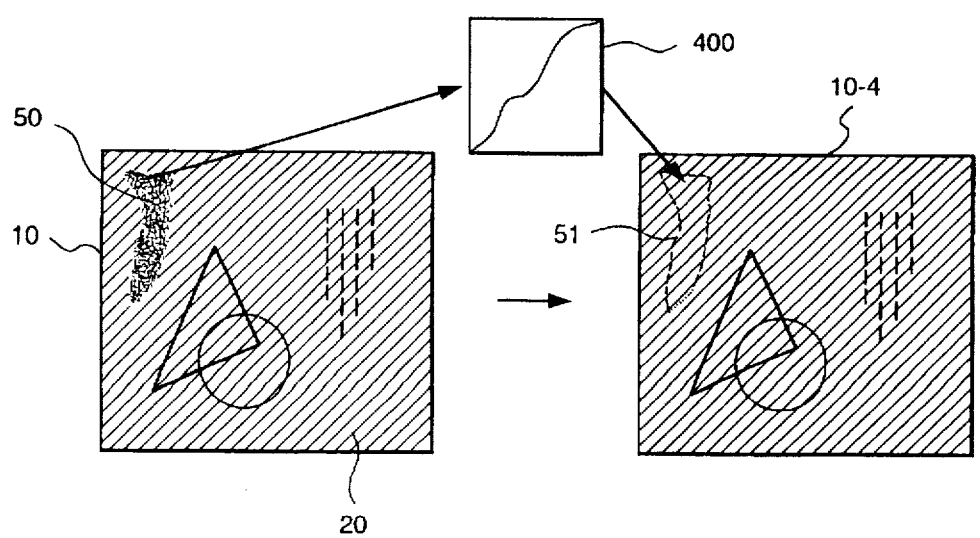
FIG. 7 is an illustration showing an embodiment of a processing method for making stains adhered to an original drawing inconspicuous.

FIG. 7 shows a display image 10-4 in which a light stained portion 51 remains by processing the stained portion 50 of the original drawing 10 by the histogram matching filter 400 and approximating it close to the paper portion 20.

When a process of passing through a histogram matching filter is executed like this, various desired images can be obtained easily.

Figure 6:
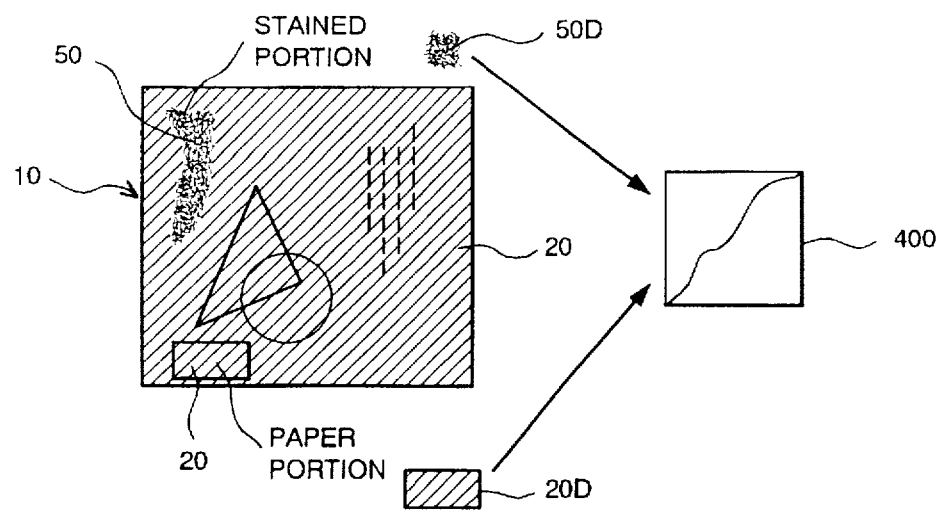
FIG. 6 is an illustration showing an embodiment of a processing method for removing stains adhered to an original drawing.

When stains are adhered to a background drawing of an original drawing comprising a paper, the aforementioned processing methods shown in FIGS. 6 and 7 are suited to a process of eliminating the stains or making them inconspicuous and by processing them by a histogram matching filter, a more perfect stains removal operation can be made possible. Furthermore, by automatically executing each of those processes, a series of steps can be processed in a shorter time.

Figure 8:
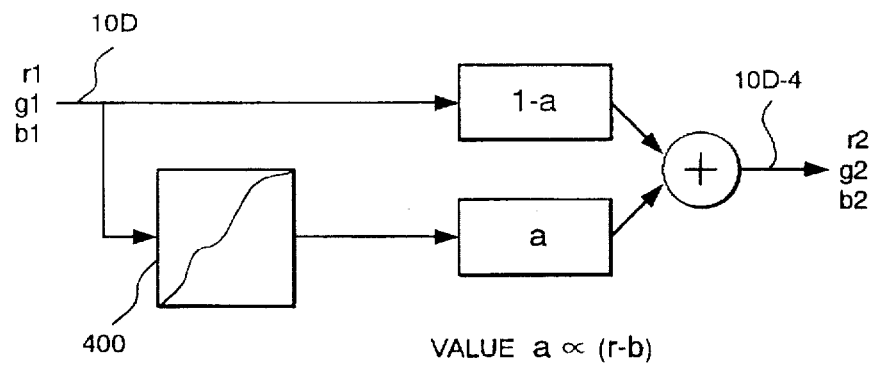
FIG. 8 is an illustration showing an embodiment which is different from the embodiment shown in FIG. 7.

FIG. 8 shows an illustration of a processing method for creating the image data 10D on the basis of an original drawing having a reddish-brown stain on a white paper portion and passing only the image data 10D through the histogram matching filter 400 so as to remove the reddish-brown stained portion.

First of all, the histogram matching filter 400 for converting the color of the reddish-brown stain to white is created by the aforementioned method or the histogram matching filter 400 is read from the image processing file stored beforehand.

Next, the image data 10D is read from the image file stored beforehand, and optional one pixel among all the pixels constituting the image data 10D is aimed at, and assuming three color informations of this one pixel as r1 (red), g1 (green), and b1 (blue), one of these color informations is inputted to a [1-a] processor and the other is inputted to the histogram matching file 400. In this case, a symbol "a" indicates a constant corresponding to the color of the reddish-brown stain and since a reddish stain indicates a characteristic that the value of r-b increases, the constant is set to a value of r1-b1 using this characteristic.

The color informations processed by the [1-a] processor are converted to (1-a)r1, (1-a)g1, and (1-a)b1 which are multiplied by (1-a), whereas the color informations processed by the histogram matching filter 400 are converted to r1', g1', and b1' and furthermore multiplied by a by the [a] processor so as to get (a)r1, (a)g1, and (a)b1. These two kinds of color informations are added and color informations r2=(1-a)r1+(a)r1', g2=(1-a)g1+(a)g1, and b2=(1-a)b1+(a)b1' are outputted finally.

Optional one pixel is converted in color by the above processes and when the processes are executed for all the pixels of the image data 10D, the original image is converted in color, so that the reddish-brown stain on the white paper portion is removed.

The aforementioned processing method shown in FIG. 8 creates image data according to an original drawing having a reddish-brown stain on the white paper portion and removes the reddish-brown stain by passing only the image data through the histogram matching filter so as to automatically extract only the stain and approximate to the paper. Furthermore, by automatically executing each of those processes, a series of steps can be processed in a shorter time.

Figure 15:
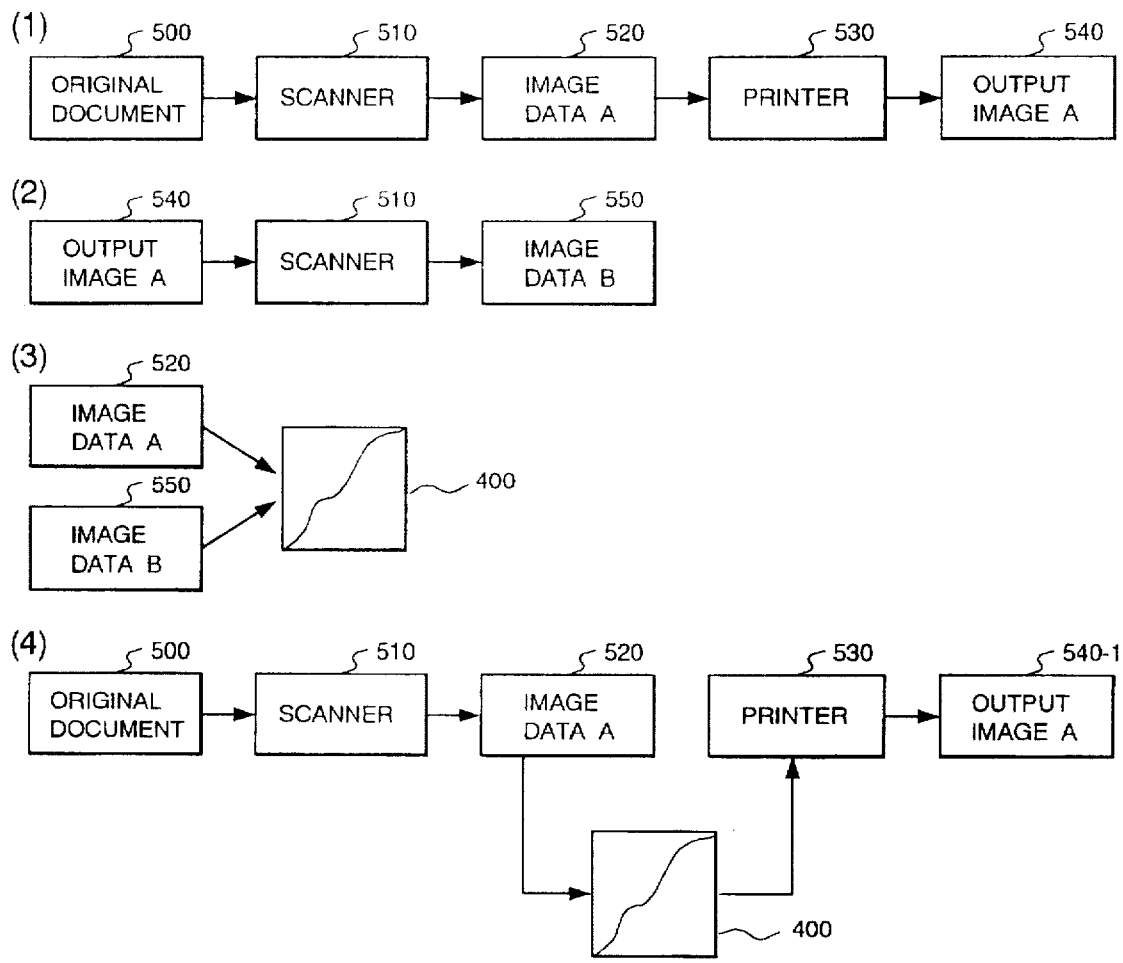
FIG. 15 is an illustration showing still another embodiment of the image processing method of the present invention.

FIG. 15 is an illustration showing a process of bringing an output image of a printer closer to a document by using a histogram matching filter.

Firstly in (1), a document 500 is read by a scanner 510 and first image data A 520 is obtained. The first image data A 520 can be stored in the image file as required. The image data A 520 is inputted to a printer 530 and an output image A 540 is obtained.

Next in (2), the output image A 540 is read by the same scanner 510 again and second image data B 550 is obtained. The second image data B 550 can be stored in the image file as required.

In this case, the first image data A 520 and the second image data B 550 ought to be the same data originally. However, they may be different from each other depending on the character of the scanner and the printer.

Therefore, in (3), a histogram matching filter 400 for bringing the second image data B 550 close to the first image data A 520 is created by the aforementioned method explained in FIGS. 9 to 14 on the basis of the first image data A 520 and the second image data B 550. In this case, the created histogram matching filter 400 is stored in the image processing file or the image file. However, needless to say, it can be stored in the main memory (not shown in the drawing) of the computer.

By the processes in (1) to (3), the histogram matching filter 400 for bringing the second image data B 550 close to the first image data A 520 can be obtained, so that a process of bringing an output image of the printer closer to the document will be explained by using this histogram matching filter 400.

In (4), the document 500 is read by the scanner 510, and the first image data A 520 is obtained, and the data is processed by the histogram matching filter 400, and the output is inputted to the printer 530, and an output image A 540-1 is obtained.

When these processes are executed, the output image A 540-1 eliminates the characteristics of the scanner and the printer and a print closer to the document 500 can be obtained.

By the aforementioned processing method shown in FIG. 15, an output image of the printer can be brought closer to a document by using the histogram matching filter and furthermore, by automatically executing each of those processes, a series of steps can be processed in a shorter time.

Figure 16:
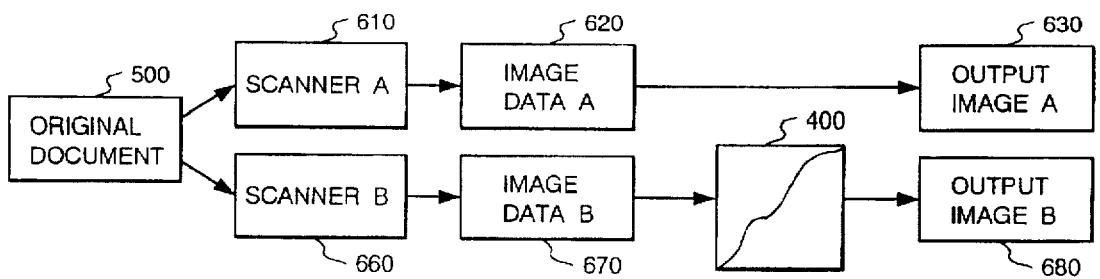
FIG. 16 is an illustration showing a further embodiment of the image processing method of the present invention.

Furthermore, FIG. 16 is an illustration when output images when the same document is read by different scanners are brought to close to a document by using a histogram matching filter.

The document 500 is read by a first scanner A 610 and first image data A 620 and a first output image A 630 are created. In this case, the first image data A 620 is stored in the image file. However, needless to say, it may be stored in the main memory of the computer. The first image data A 620 is inputted to a printer which is not shown in the drawing and the output image A 630 is obtained as an output thereof. On the other hand, the same document 500 is read by a second scanner B 660 and second image data B 670 is created. In this case, the second image data B 670 is stored in the image file. However, needless to say, it may be stored in the main memory of the computer.

The second image data B 670 is inputted to the histogram matching filter 400 to which a characteristic for bringing the second image data B 670 close to the first image data A 620 is given on the basis of the first image data A 620 and the second image data B 670, and an output at this time is inputted to a printer which is not shown in the drawing, and an output image B 680 is obtained as an output thereof. Therefore, the second output image B 680 which is outputted after the second image data B 670 is processed by the histogram matching filter 400 is approximated to the first output image A 630 which is obtained by the first scanner A 610.

By the aforementioned processing method shown in FIG. 16, output images when the same document is read by different scanners can be brought close to the document by using the histogram matching filter and a difference between the output images caused by a difference between the scanners reading the document can be eliminated.

Furthermore, by automatically executing each of those processes, a series of steps can be processed in a shorter time.

As explained above in detail, by the image processing method of the present invention, when an original drawing in which a character and figure drawing is drawn on a background drawing is converted to image data, and the image data is separated to background image data and character and figure image data, and the separated image data is composed, image data to which a new additional value is added by removing spots and stains adhered to the background drawing of the original drawing or changing the medium of the original drawing, for example, from a paper to a wooden plate or stone can be created and these image data can be stored in the image file as required.

Furthermore, the creation process of image data can be executed by a program stored in the image processing file which is read by the image display device, so that this creation process can be executed more easily in a shorter time compared with the conventional creation process.

The present invention can be executed in a form different from those of the aforementioned embodiments without deviating from the concept or main characteristics thereof. Therefore, the aforementioned embodiments are just an example of the present invention in all respects and the present invention is not limited to those. The scope of the present invention is indicated by the claims. Furthermore, modifications and changes belonging to the claims are included in the scope of the present invention.

What is claimed is:

1. An image processing method for processing image data which is obtained by reading a document in which a character and figure drawing is drawn on a background drawing by a scanner, comprising at least the following steps of:
   (a) separating background image data from said image data by processing a maximum filter for comparing the brightness of each pixel constituting said image data with the brightness of peripheral pixels and replacing it with the maximum brightness; and
   (b) separating character and figure image data by subtracting said background image data from said image data.

2. A recording medium for storing a program of the image processing method stated in claim 1.

3. An image processing method for composing image data different from said background image data as background image data and said character and figure image data stated in claim 1.

4. An image processing method for processing image data which is obtained by reading a document in which a character and figure drawing is drawn on a background drawing by a scanner, comprising at least the following steps of:
   (a) decomposing said image data to data of each color of yellow, magenta, cyan, and black;

(b) separating character and figure image data from said image data using the data of at least one color which is obtained by said step of decomposing said image data to data of each color; and (c) separating background image data by subtracting said character and figure image data from said image data.

5. A recording medium for storing a program of the image processing method stated in claim 4.

6. An image processing method for processing image data which is obtained by reading a document in which a character and figure drawing is drawn on a background drawing by a scanner, comprising at least the following steps of:

(a) separating background image data from said image data by processing a maximum filter for comparing the brightness of each pixel constituting said image data with the brightness of peripheral pixels and replacing it with the maximum brightness;

(b) separating character and figure image data by subtracting said background image data from said image data; and (c) composing said background image data and said character and figure image data which are separated by said steps.

7. A recording medium for storing a program of the image processing method stated in claim 6.

8. An image processing method for processing image data which is obtained by reading a document in which a character and figure drawing is drawn on a background drawing by a scanner, comprising at least the following steps of:

(a) decomposing said image data to data of each color of yellow, magenta, cyan, and black;

(b) separating character and figure image data from said image data using the data of at least one color which is obtained by said step of decomposing said image data to data of each color;

(c) separating background image data by subtracting said character and figure image data from said image data; and (d) composing said background image data and said character and figure image data which are separated by said steps.

9. An image processing method for processing image data which is obtained by reading a document in which a character and figure drawing is drawn on a background drawing by a scanner, comprising at least the following steps of:

(a) separating background image data from said image data by processing a maximum filter for comparing the brightness of each pixel constituting said image data with the brightness of peripheral pixels and replacing it with the maximum brightness;

(b) separating character and figure image data by subtracting said background image data from said image data; and (c) composing said image data of said document which is read and obtained by said scanner and said background image data and said character and figure image data which are separated by said steps.

* * * * *